June 15, 1948. O. P. CHURCHILL Re. 23,006
SWIM-FIN
Original Filed Sept. 27, 1940
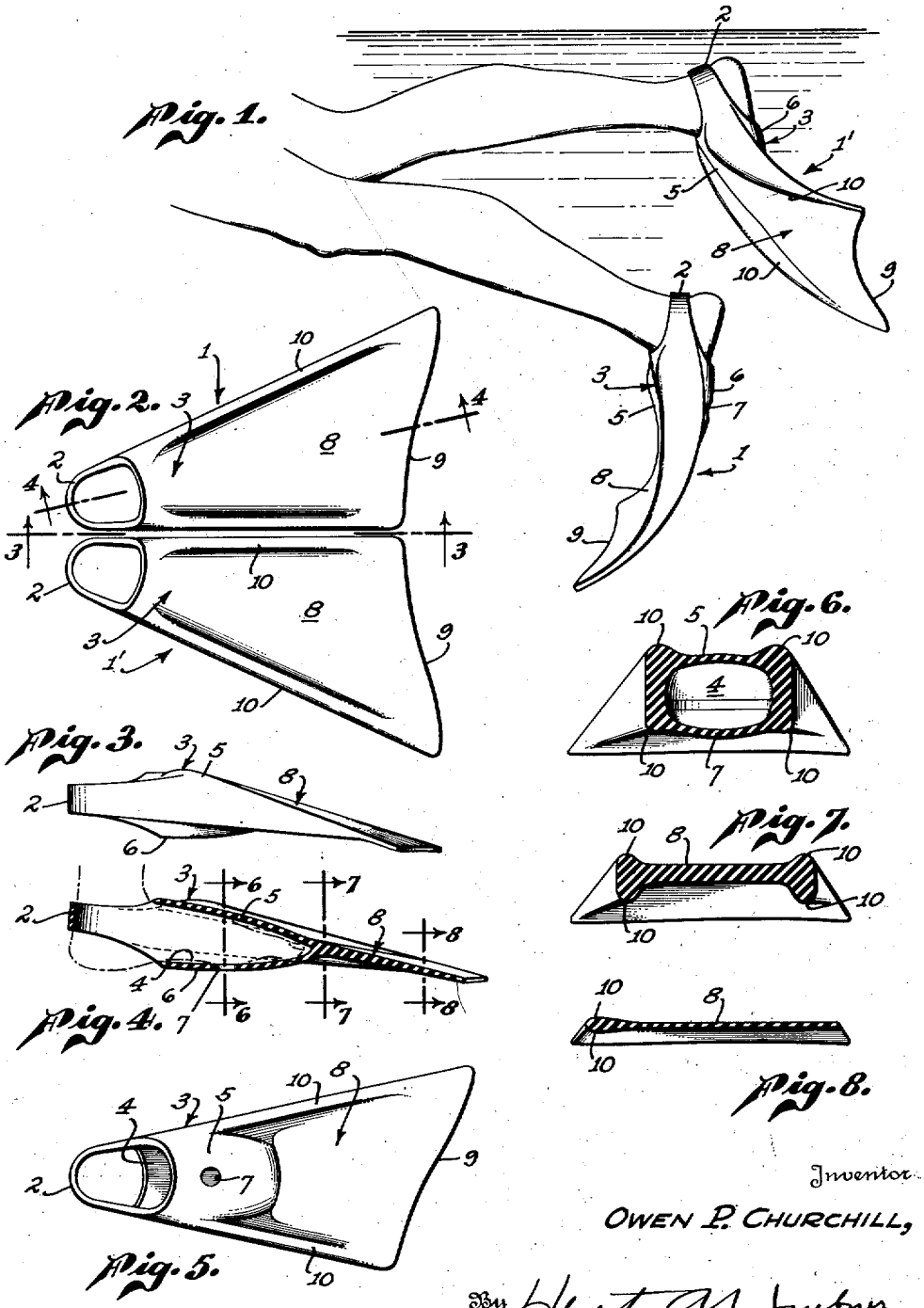
Inventor
OWEN P. CHURCHILL,
By Colbert A. Gulbrer
Attorney Reissued June 15, 1948 Re. 23,006

UNITED STATES PATENT OFFICE 23,006

SWIM FIN

Owen P. Churchill, Los Angeles, Calif.

Original No. 2,321,009, dated June 8, 1943, Serial No. 358,637, September 27, 1940. Application for reissue February 18, 1948, Serial No. 9,261

5 Claims. (Cl. 9—21)

My invention relates to a novel type of swim-fin which is attached to the feet and is used as an aid in swimming, water treading, life-saving, and in other aquatic pursuits.

My invention more particularly relates to improvements in swimming devices, which are worn on the feet of the person engaged in aquatic activities and whereby the swimming speed is materially increased. My invention, in the experience of aquatic experts, instructors and professional swimmers, represents an efficient and practical improvement in swimming means. It has been approved and is being regularly employed by professional swimming instructors, coaches, swimmers, life guards and the like.

The use of devices embodying my invention enables a person to propel his body through the water at a materially increased speed and at a minimum of effort and fatigue. The device may be used with equal advantages for either long or short distance swimming.

The feet and legs of a human being were not designed by nature for swimming and other water activities and the use of my invention converts the feet into swimming members of correct hydrodynamic structure and design.

Swimming instructors employ devices incorporating my invention as it has been found that the use thereof gives confidence to beginners, and the art of swimming may be learned much more quickly and readily than where the unaided feet are relied on.

By increasing the speed of the swimmer the devices employing my invention likewise act to elevate the feet of the swimmer and thereby tend to overcome a problem which always confronts persons who are learing to swim, as it is difficult for a beginner to keep the feet elevated.

In addition to increased speed, the use of my invention enables a person to tread water much more efficiently and safely and in that respect is a distinct advantage to persons employed as life guards, for it enables them to perform rescue work in a manner which is otherwise thought to be impractical if not impossible. For example, the life guard while using devices incorporating my invention can much more easily stand erect in the water with chest and shoulders above water and thereby have the complete free use of his arms and hands in performing the rescue work. He can also much more readily support and propel the other person through the water because of the increased swimming efficiency which the devices provide.

Devices embodying my invention have special utility in that they permit a relaxation of the ankles which is desirable in advanced swimming. The devices are also highly efficient for increasing speed while swimming under water.

Devices embodying my invention may be used with great efficiency by persons engaged in diving. The devices may be employed in such sports and industries as the following: spearing fish, abalone hunting, lobster catching, pearl diving, etc. They may also be used very successfully for swimming under water or for standing in and treading water when it becomes necessary to inspect and disengage mooring lines and anchor chains of vessels which have become fouled or tangled and generally to inspect the condition of a vessel's hull which is at or below the water line. In such connection the devices enable the user to have the free use of his hands and arms while supporting himself in the water by means of the devices in a substantially upright position.

My invention so materially increases the speed of a swimmer that ordinarily a person using same can swim as fast without his hands as he could by employing his feet and legs without the devices. The devices also enable life guards and others who desire to wear life belts and jackets to progress with material speed through the water, which is ordinarily very difficult, if not impossible, without the use of my invention.

Devices employing my invention can be used with equal efficiency for any kind of a kick employed in speed and short or long distance swimming. They have been found advantageous for the scissors kick, the flutter kick, the frog kick, and all other well known movements of the legs and feet which are variously employed by swimmers. The devices enable a person to attain what may be termed a propeller push which resembles the action of a fish fin or tail. The tapering of the devices affords a fish fin streamlining which gives an increased area of push or propulsion with a minimum of water resistance.

I am familiar with and in fact am the exclusive licensee under United States Letters Patent 2,099,973, dated November 23, 1937, granted to Louis de Corlieu, for Life saving and swimming propelling device. Without minimizing the efficacy and scope of the invention claimed in that patent, I consider my invention to be an improvement and to have many advantages thereover, some of which may be enumerated as follows:

I dispense entirely with any and all metal reinforcements. I thereby decrease the weight of the devices and attain such advantages as increased flexibility, which is desirable while walking with the devices on dry land or in riding surf boards and the like, and also while using the devices in the water; I eliminate the necessity of utilizing the type of crepe rubber which the aforementioned patent prefers in order to give buoyancy to the devices and I am thereby able to use other forms of rubber or synthetic rubber, which are much more desirable and which have a longer life than does crepe rubber; I overcome the inherent disadvantages of metal which will rust and break and bend while in use and which tends to tear the enclosing rubber structure under certain conditions of use. The hazard of injury to the wearer which is ever present in the use of metal is entirely eliminated in my invention. My devices are also constructed so as to fit the feet of the wearer which advantage is attained by molding and curving the foot pocket over the instep so as to afford a snug but comfortable fit or closure.

My invention attains still other advantages which result from improved structure and form over the invention of the aforementioned patent, and otherwise, and which will become obvious from a further description thereof.

An object of my invention is to provide in a swim-fin of the character described a relatively flexible construction which when in use in the water will adapt itself to the movement of the feet and legs while swimming, treading water, and the like, and which with a minimum of water resistance will afford an increased area of propulsion.

A further object of my invention is to provide in a swim-fin of the character described a propelling device which may be utilized by beginners as well as by expert swimmers, life guards and others, and which materially increases the speed while swimming and which likewise increases the buoyancy of the body while at rest or "standing" in the water.

Another object of my invention is to provide in a swim-fin of the character described a symmetrical stream-lined molded rubber device which is relatively simple and inexpensive to manufacture and which can be molded and manufactured in one piece. In such respect I wish to point out that devices which embody the invention of the aforementioned Patent 2,099,973 are made in approximately 18 pieces which are cemented together and which have all of the disadvantages which are inherent in such construction. For instance, pieces may pull apart while in use and devices embodying my invention will last longer and will stand considerably greater stress and strain than the other type of devices.

A still further object of my invention is to provide in a device of the character described a hole or orifice disposed in the bottom thereof, which permits the expulsion of water and sand which may collect in the foot pocket and which at the same time provides a suction cup or grip when the devices are used by a person standing or walking, on a slippery surface, such as surf boards, aquaplanes and the like.

Another object of my invention is to provide in a device of the character described reinforcing beads along the top and bottom sides thereof which afford sufficient firmness but at the same time provide the desired degrees of flexibility to permit the efficient use of the device.

Devices incorporating my invention may be made of rubber or of synthetic rubber or other rubber substitutes and compounds.

Another advantage possessed by devices embodying my invention, is that identification marks and symbols and instructions may be molded or impressed in the rubber and will not wash or wear off, as would be the case if they were merely stamped, etc.

In the drawing:

Figure 1 is a perspective of the devices attached to the feet of a swimmer in substantially horizontal position.

Figure 2 is a top plan view of a pair of the devices, the upper one being intended for the left foot and the lower one for the right foot.

Figure 3 is a side elevation of the device intended for the left foot.

Figure 4 is a longitudinal cross-section of the device taken on the line 4—4 of Figure 2.

Figure 5 is a bottom plan view of the device intended for the right foot.

Figure 6 is a horizontal cross-section taken on the line 6—6 of Figure 4.

Figure 7 is a horizontal cross-section taken on the line 7—7 of Figure 4.

Figure 8 is a horizontal cross-section taken on the line 8—8 of Figure 4.

The preferred form chosen to illustrate my invention comprises a left fin 1 and a right fin 1'. An elastic heel strap 2 constitutes the "heel" portion of the device and joins a central portion 3 which consists of a hollow wedge shaped foot pocket 4 having a convexly curved top 5 and bottom 6. An equivalent structure and form might eliminate the convex curvatures, but I prefer them as shown to conform to the instep and ball of the foot respectively.

It would be an equivalent to use a stronger or larger heel strap than the preferred form illustrated in my present application, or even to eliminate the heel strap entirely and to extend the foot pocket to the extreme rear end of the device.

A hole or orifice 7 is disposed in the bottom of the central portion for drainage purposes and to provide a suction cup on flat surfaces.

The "toe" portion 8 of the device which joins the central portion is relatively flat and of increasing breadth and in the preferred form has a curved diagonal end 9, although a straight edge could be used. There are reinforcing tapered beads 10 extending along the upper and lower sides or edges of the central and "toe" portions of the device and which extend substantially to the end of the said "toe" portion. It is important that these beads provide a firmness to the structure sufficient to withstand collapse under water pressure but sufficient flexibility to permit a yielding of the fin progressively toward the "toe" portion as the fin is moved against the water.

The use of my invention may be described as follows: The left fin is placed on the left foot of the wearer and the right fin on the right foot, by inserting the foot within the foot pocket comprising the central portion, so that the heel strap engages the foot just above the heel or at the point where the Achilles tendon is located.

Due to the flexibility of the devices it will be found that the user is able to walk with comparative ease and unless the surface be especially rough or sharp, such as from rocks or glass, no injury to the devices will result.

When the user is in the water he may employ the devices in the same manner as he would use his legs and feet without the devices, and with very little practice he will be able to augment the use of the feet and legs so as to propel himself through the water with materially increased speed and ease and with a minimum of discomfort and fatigue.

Whatever be the basic movement imparted to the fins by the wearer, such movement results in a propulsion generating at the heel and carried outwardly to the "toe" of the fin. The streamlining or hydrodynamic shape, embodied in a structure flexible yet firm enough to withstand collapse under water pressure, utilizes an action similar to that of a fish's fin or tail, and imparts a thrust during both oscillating movements of the foot.

The devices may be utilized for swimming, either in the normal position or on the back, and will afford increased speed notwithstanding the type of leg kick which may be employed.

It will also be found that a person wearing the devices may stand upright in the water by "treading" and expose a much greater portion of his body above the surface thereof than he would be able to do without the devices even with the hands employed as a supplementary means to keep afloat.

When standing on a wet, slippery surface such as an aquaplane or surf board, it will be found that the hole in the bottom of the center section will act as a suction cup more securely to hold the fin against the wet surface thereof. The hole will also act as an outlet for sand and water which might otherwise collect and remain in the foot pocket.

If the fin is used for life saving, it will be found that the user can readily support himself in an upright position in the water and have the full and free use of his arms and hands.

Persons learning to swim will be able to use the fins with equal facility and will find that the use thereof greatly reduces the time necessary in order to become an efficient swimmer.

Other uses and applications of devices embodying my invention will be obvious to anyone utilizing same and no attempt is made herein to enumerate all of those uses and objects.

Various modifications constituting equivalents may be used in the details of the device within the scope of my invention, and my invention is not to be limited to the preferred form which I have illustrated and described in this application.

I claim:

1. A swim-fin of resilient material, adapted to be mounted on the foot and embodying a hydrodynamic fin shape comprising a heel gripping section, a central section forming a pocket to receive the forepart of the foot, and a toe extension web continuing the natural wedge shape of the foot, the toe extension web having one side diverging with respect to the other toward the free end, and said end being diagonally formed whereby the outer side is longer than the inner side, the central section and the toe extension having a gradually increasing flexibility toward the said end.

2. A swim-fin of resilient material, adapted to be mounted on the foot and embodying a hydrodynamic fin shape comprising a heel gripping section, a central section forming a pocket to receive the forepart of the foot, and a toe extension web continuing the natural wedge shape of the foot, the said heel gripping section, central section and toe extending web having one side diverging with respect to the other from the heel toward the free end of the toe extension, the wedge being longer along the outer side than on the inner side, the end of the toe extension being substantially diagonal from the shorter side to the longer side, and marginal reinforcements along the said sides whereby the fin is rendered more flexible in the region of its medial longitudinal line than along its sides, tending to cup under resistance of water and displacing water with a propeller-like thrust when moved at right angles to the normal plane of said fin.

3. A swim-fin of resilient material adapted to be mounted on the foot and embodying a hydrodynamic fin shape comprising a heel gripping section, a central section forming a pocket to receive the forepart of the foot, and a toe extension web continuing the natural wedge shape of the foot, the said heel gripping section, central section and toe extension web having one side diverging with respect to the other from the heel toward the free end of the extension, the wedge being longer along the outer side than on the inner side, the end of the toe extension web being substantially diagonal from the shorter side to the longer side, and marginal reinforcements along the said sides whereby the fin is rendered more flexible in the region of its medial longitudinal lines than along its sides, tending to cup under resistance of water and displacing water with a propeller-like thrust when moved at right angles to the normal plane of said fin, said marginal reinforcements comprising beads raised from the upper and lower surfaces of the fins whereby a directional thrust is imparted for the displacement of water longitudinally along the surfaces of the fin.

4. A swim-fin of resilient material adapted to be mounted on the foot and embodying a hydrodynamic fin shape comprising a heel gripping section, a central section forming a pocket to receive the forepart of the foot, and a toe extension web continuing the natural wedge shape of the foot, the said heel gripping section, central section and toe extension web having one side diverging with respect to the other from the heel toward the free end of the extension, the wedge being longer along the outer side than on the inner side, the end of the toe extension web being substantially diagonal from the shorter side to the longer side, and marginal reinforcements along the said sides whereby the fin is rendered more flexible in the region of its medial longitudinal lines than along its sides, tending to cup under resistance of water and displacing water with a propeller-like thrust when moved at right angles to the normal plane of said fin, said marginal reinforcements comprising beads raised from the upper and lower surfaces of the fins whereby a directional thrust is imparted for the displacement of water longitudinally along the surfaces of the fin, and said beads terminating approximately the same distance short of the end of the toe extension web leaving the end unreinforced whereby it will tend to flex diagonally substantially parallel to the end edge thereof.

5. A swim-fin of resilient material, adapted to be mounted on the foot and embodying a hydrodynamic fin shape comprising a heel gripping section, a central section forming a pocket to receive the forepart of the foot, and a toe extension web having one side diverging with respect to the other toward the free end, the toe extension web being relatively thin throughout its medial portion, and having marginal beads relatively thick at their forward portion and tapering to merge into the planes of the web toward the end thereof, whereby the web is rendered increasingly flexible toward the end and a directional thrust is imparted for the displacement of water longitudinally along the surfaces of the fin.

OWEN P. CHURCHILL.